(12) United States Patent
Verlaan et al.

(10) Patent No.: US 8,694,904 B2
(45) Date of Patent: Apr. 8, 2014

(54) CROSS-BROWSER RICH TEXT EDITING VIA A HYBRID CLIENT-SIDE MODEL

(75) Inventors: Adri Verlaan, Seattle, WA (US); George Perantatos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 981 days.

(21) Appl. No.: 12/103,694

(22) Filed: Apr. 15, 2008

(65) Prior Publication Data

US 2009/0259949 A1 Oct. 15, 2009

(51) Int. Cl.
*G06F 3/048* (2013.01)
(52) U.S. Cl.
USPC ........................................... 715/770
(58) Field of Classification Search
USPC ........................................... 715/760
See application file for complete search history.

(56) References Cited

U.S. PATENT DOCUMENTS

| | | | |
|---|---|---|---|
| 5,861,883 A | 1/1999 | Cuomo et al. | |
| 6,151,609 A * | 11/2000 | Truong | 715/205 |
| 6,230,171 B1 | 5/2001 | Pacifici et al. | |
| 6,571,295 B1 * | 5/2003 | Sidana | 709/246 |
| 6,865,599 B2 | 3/2005 | Zhang | |
| 6,973,625 B1 | 12/2005 | Lupo et al. | |
| 8,527,364 B2 * | 9/2013 | Moore et al. | 705/26.5 |
| 2001/0013043 A1 * | 8/2001 | Wagner | 707/511 |
| 2002/0091725 A1 * | 7/2002 | Skok | 707/501.1 |
| 2003/0101235 A1 * | 5/2003 | Zhang | 709/218 |
| 2003/0204810 A1 * | 10/2003 | Dam et al. | 715/500 |
| 2004/0019849 A1 * | 1/2004 | Weng et al. | 715/513 |
| 2004/0268235 A1 | 12/2004 | Wason | |
| 2006/0248442 A1 | 11/2006 | Rosenstein et al. | |
| 2007/0067418 A1 | 3/2007 | Isaacs et al. | |
| 2008/0244740 A1 * | 10/2008 | Hicks et al. | 726/22 |
| 2009/0183062 A1 * | 7/2009 | Pally | 715/217 |
| 2009/0249216 A1 * | 10/2009 | Charka et al. | 715/744 |

OTHER PUBLICATIONS

Whizzywig web based rich text editor for free by Unnverse.net. Internet Wayback archive Oct. 2005. 7 pages.*
OpenWYSIWYG 1.0 overview by OpenWebWare, Internet Wayback archive Jan. 6, 2007. 2 pages.*
Summers, "Structured Editing: Cross-Browser Javascript Text Editor", Ben Summers, 2006.
"YUI 2.3 Released: Rich Text Editor, Components, and Themes" Aug. 1, 2007.
"Nitobi Grid" Mar. 2007, Nitobi Software Inc.
"Interspire DevEdit NX" Apr. 11, 2006, Interspire.
"Web Wiz Rich Text Editor", 2001-2008, Web Wiz.
Specht, "Using Web-Browsers as Application Platform", Jan. 20, 2003.

* cited by examiner

*Primary Examiner* — William Bashore
*Assistant Examiner* — Hien Duong
(74) *Attorney, Agent, or Firm* — Tom Wang; Jim Ross; Micky Minhas (57) ABSTRACT

A full-featured cross-browser hybrid rich text editor for editing webpage content. The hybrid editor is integrated with a user interface (e.g., toolbar, menu bar), and provides the appropriate context-sensitive behavior when users interact with the user interface and the interface contents. The hybrid editor responds immediately to basic commands (e.g., cursor movements, inserts, selections, repeated key presses, etc.), and employs behaviors and effects that are more aligned with familiar editor experiences, such as in a word processor. The editor architecture leverages the strengths of both the current browser content editability and JavaScript, limits the browser-based content editing to the insertion pointer, paste, processes content as the content is entered or when cursor is moved around, and implements an abstraction layer that maps browser-specific functions independent of the browser to the underlying support of the hybrid editor.

20 Claims, 10 Drawing Sheets

CROSS-BROWSER RICH TEXT EDITING VIA A HYBRID CLIENT-SIDE MODEL

BACKGROUND

The state of the art for browser-based rich text editors (RTEs) (e.g., WYSIWYG—what you see is what you get) typically falls into the same pattern, the leveraging of browser support for content editable regions (e.g., for one browser this includes marking a <div> element with the content editable property set to "true"), and writing client-side script to offer additional features on top of what the browser supports (e.g., a richer way to operate on tables).

Given the browser support for content editing is nowhere near what tools such as some word processing applications can provide, RTEs add JavaScript™ on top of browser editing to offer additional features.

However, this still introduces problems. With respect to cross-browser editing, different browsers offer different levels of browser editing support in different ways. Therefore, it is difficult to implement a cross-browser implementation of the same RTE. Additionally, when JavaScript is added on top, there are browser-specific differences that make this difficult to implement.

Another problem is related to turning off content-editable features of the browser. Some browsers have content-editable features that overlap with RTEs and that are difficult or impossible to turn off. For example, one browser has special UI that appears when clicking in a table for creating rows and columns. Unfortunately, those commands do not respect the styles applied to the table for colors, fonts, and borders. In addition, this browser has a spell check feature that does not do enough; for example, the browser spell checker does not detect duplicate words such as 'the the' and flag one of the words as an error.

Yet another problem relates to flowing text around content. In some browsers, the only way to get browser content editability on a portion of content is to place that content in an IFrame on the page, or as previously stated, mark a content-editable attribute as "true" on a block element (<div>). This means that the content is not truly WYISWYG on the page, as the content does not follow the same HTML rules as inline text would follow, such as flowing around other content on the page such as images. The end result is that while the user can see how the content will be styled while the content is being edited, the user will not see how the content will be laid out on the page while the user is editing. However, the browser still offers some advantages that are desirable to leverage in an RTE implementation. For example, it is difficult if not impossible in a script-only implementation to leverage client text services that offer IME (input method editor) support for non-English character entry. It is also difficult to process the many clipboard formats that the client may have when pasting content into the RTE and choose the right content and format to paste into the RTE when a user executes a paste command. In both of these examples, simulating these behaviors in an RTE implementation that relied only on JavaScript would at best result in a low-fidelity facsimile.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes a full-featured cross-browser hybrid rich text editor for editing webpage content in different browsers that may be employed. The editor architecture is integrated with a user interface (e.g., toolbar, menu bar, etc.), and provides the appropriate context-sensitive behavior when users interact with the user interface. The editor offers features that shorten time to success, or enable something previously only doable through source editing. The hybrid editor responds immediately to basic commands (e.g., cursor movements, inserts, selections (e.g., using JavaScript to update the HTML when the user formats a selection to apply formatting), repeated key presses, etc.), and employs behaviors and effects that are more aligned with familiar editor experiences, such as in a word processor.

The editor architecture leverages the strengths of both the current browser content editability and JavaScript, limits the browser-based content editing to the insertion pointer (e.g., IME (input method editor), paste), processes content as the content is entered or when cursor is moved around, and implements an abstraction layer for JavaScript so that functions are offered independent of browser and the abstraction layer takes care of mapping between an RTE (rich text editor) and the browser-specific behavior. For example, some browser JavaScript engines lack specific functions, but offer other functions.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

The disclosed architecture is a full-featured cross-browser hybrid rich text editor (RTE) for editing webpage content in different browsers that may be employed on computing systems and/or devices. The editor can be integrated with and accessed via a user interface such as a toolbar or menu bar, and provides the appropriate context-sensitive behavior when users interact with the user interface.

Other aspects of the hybrid editor are described herein in greater detail. For example, the hybrid editor manages its own insertion pointer for cursor movements. The insertion pointer can be a flashing cursor that indicates where content will be added. The hybrid editor employs the insertion pointer as a small content-editable browser-editable region (about one pixel wide) that can be moved up/down/left/right, as well as when transitioning to and from different structures (e.g., table cells, lists, paragraphs) in response to user commands, and which uses JavaScript to copy content out of the browser-editable region and into the HTML of the webpage as the user enters content into the RTE.

The hybrid editor can process keystrokes as the keystrokes are entered. For example, if the user is in a list, and a tab key is pressed, the current list item can be made a nested list item. Similarly, if the user types in a string that begins with http://, the string can be automatically be surrounded by a link element (<a>).

The content can be updated in the browser in realtime, to simulate committing a command. For example, when the user hovers over style options in a menu, commands are fired that gives the users a preview of what the styles would do to the content before the user commits the changes. JavaScript can also be employed here to dynamically change the RTE contents as the user previews commands.

The hybrid editor includes an abstraction layer for browser-specific functions (e.g., written in JavaScript) in support of commands. Common functions are available for processing content across all browsers, with browser-specific implementations underneath this layer.

The hybrid editor also includes a pluggable rich text "canvas" that supports adding of commands. Third parties can add new functions (e.g., JavaScript) that are available in the editor, and can be called during specific events (e.g., button clicks on a toolbar). The hybrid editor offers the use of rich text editing features in any portion of HTML. Any region of HTML wrapped with a specific CSS (cascading style sheet) class will be editable using this RTE model, provided the JavaScript is available to drive it.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives falling within the spirit and scope of the claimed subject matter.

Figure 1:
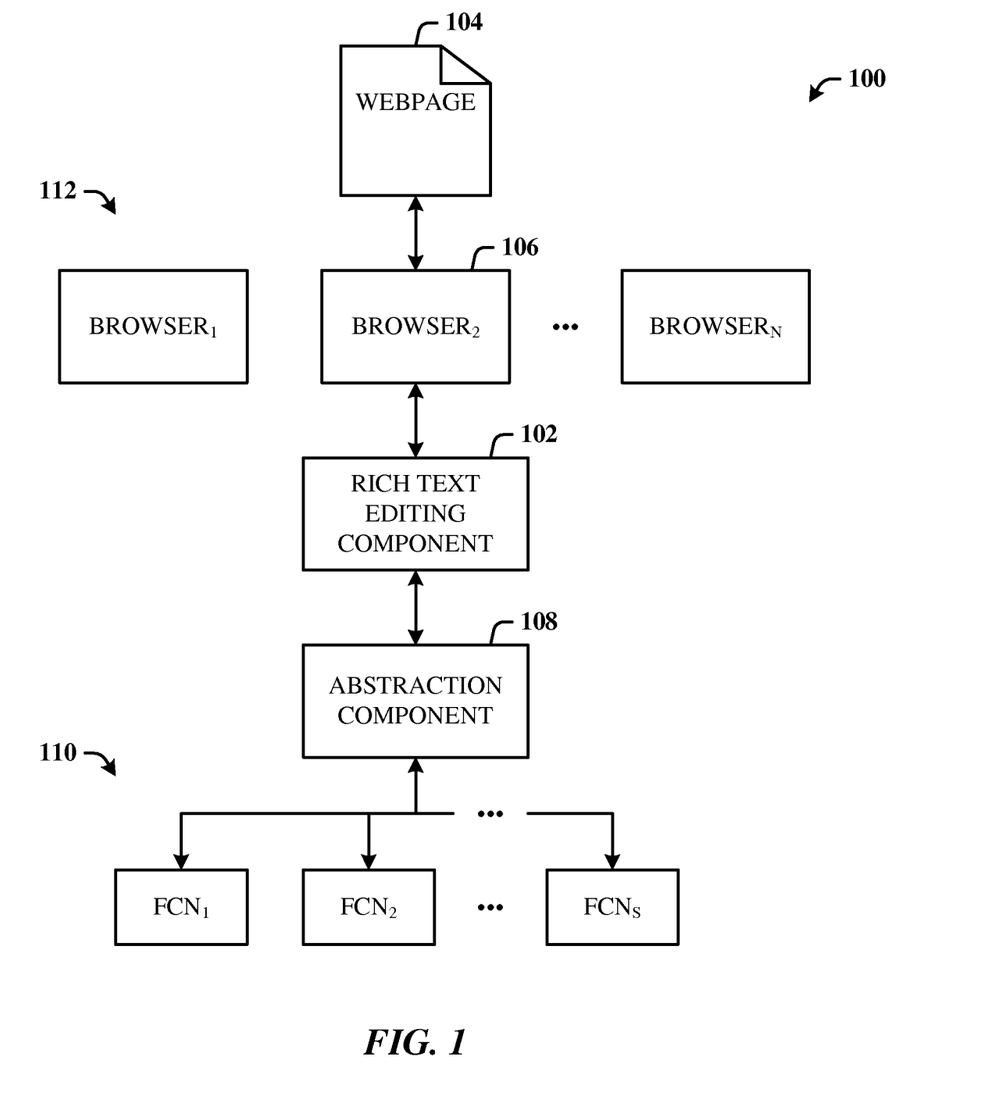
FIG. 1 illustrates a computer-implemented editing system.

FIG. 1 illustrates a computer-implemented editing system 100. The system 100 includes a rich text editing component 102 for editing content of a webpage 104 via a browser 106. An abstraction component 108 (e.g., an abstraction layer) of the system 100 exposes browser-specific functions 110 for processing the content by the rich text editing component 102. The exposed functions 110 are independent of browser editing functions.

The system 100 illustrates that the browser 106 is one of many different browser types 112 that can be installed and used on user systems. Additionally, the functions 110 are a set of functions for the different browser types 112 that can be utilized based on the particular browser 106 employed. Thus, the system 100 facilitates cross-browser rich text editing capability on a client system. The functions 110 can be based on scripting languages such as JavaScript, for example, or other suitable programmable language implementations.

Thus, the abstraction component 108 can expose browser-specific script functions for rich text editing of the browser content. The abstraction component 108 also maps the browser-specific script functions to the underlying support in the rich text editing component 102.

The rich text editing component 102 generates an insertion pointer as a content editable region in response to cursor behavior when editing the content of the webpage 104. The rich text editing component 102 does not put the whole page into an editable state (browser content-editable region), but rather makes the cursor the only true browser content-editable piece of the page. The rich text editing component 102 can handle the content inserted into the webpage 104 or manipulated in the webpage 104 via a pasting or typing operation by executing a function that copies the content out of a browser editable region into markup language of the webpage 104. The rich text editing component 102 processes the content as the content is entered, via one or more of the functions 110 exposed for assisting in the processing of the content. The rich text editing component 102 updates the content in the browser 106 in realtime.

The rich text editing component 102 includes features that are reusable in HTML portions of the webpage 104. An example of reusable features (or content) is a copyright statement that is managed centrally in a website, and inserted into the content in a read-only fashion. Another example is to describe controls or web page components that can be added to the page, similar to what personalized web pages offer on websites, that can contain both read-only and read-write contents. This is for third-party implementations, where as long as the third-party implements a commit model for the content, any region of HTML wrapped with a specific CSS class will be editable using the RTE model, and any region of HTML wrapped with another specific CSS class will be treated as read-only. Additionally, the abstraction component 108 is extensible for receiving new third-party functions that operate via the abstraction component 108 in response to specific events activated in the rich text editing component 102.

Figure 2:
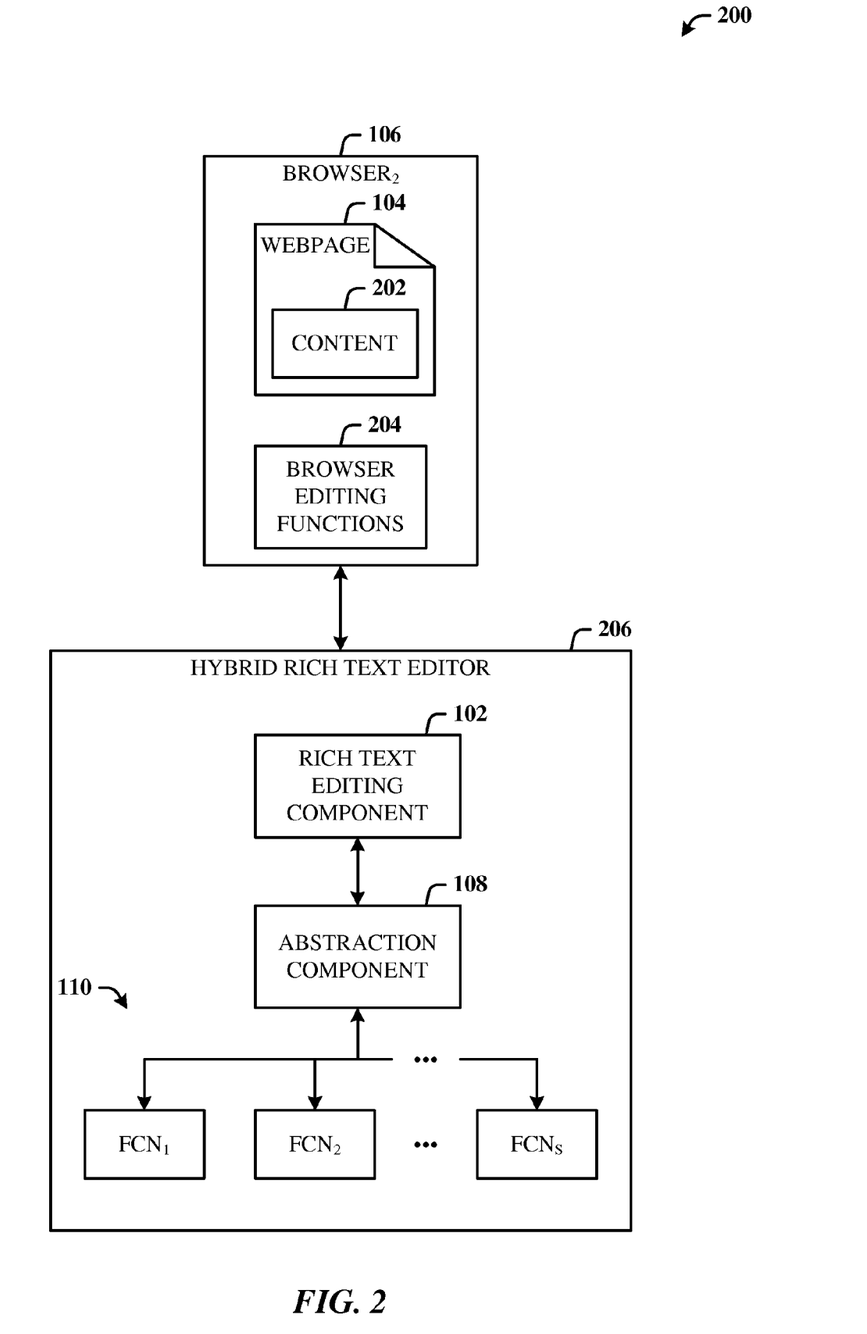
FIG. 2 illustrates a client hybrid rich text editing system.

FIG. 2 illustrates a client hybrid rich text editing system 200. The system 200 includes the rich text editing component 102 for editing content 202 (e.g., rich) of the webpage 104 via the browser 106. The content 202 is processed as the content 202 is entered and/or can be processed in association with cursor movement. The system 200 can also include the abstraction component 108 for exposing the browser-specific functions 110 as the script functions for processing by the rich text editing component 102. The exposed script functions operate independently of browser editing functions 204 and are employed for rich text cross-browser editing. The browser editing functions 204 are provided as part of the specific browser 106 used on the client system. The rich text editing component 102, abstraction component 108, and browser-specific functions 110 can be employed on a client system as a hybrid rich editor 206. Thus, in this implementation where some or all of the browser-specific functions 110 are scripts, the rich text editing component 102 processes keystrokes using JavaScript editing functions exposed by the abstraction component 108.

The rich text editing component 102 generates a content editable region as an insertion pointer in the webpage 104 and manages cursor movement, selection changes and operations over the selections in the editable region. The content editable region facilitates the presentation of the content 202 in a WYSIWYG format for editing.

Figure 3:
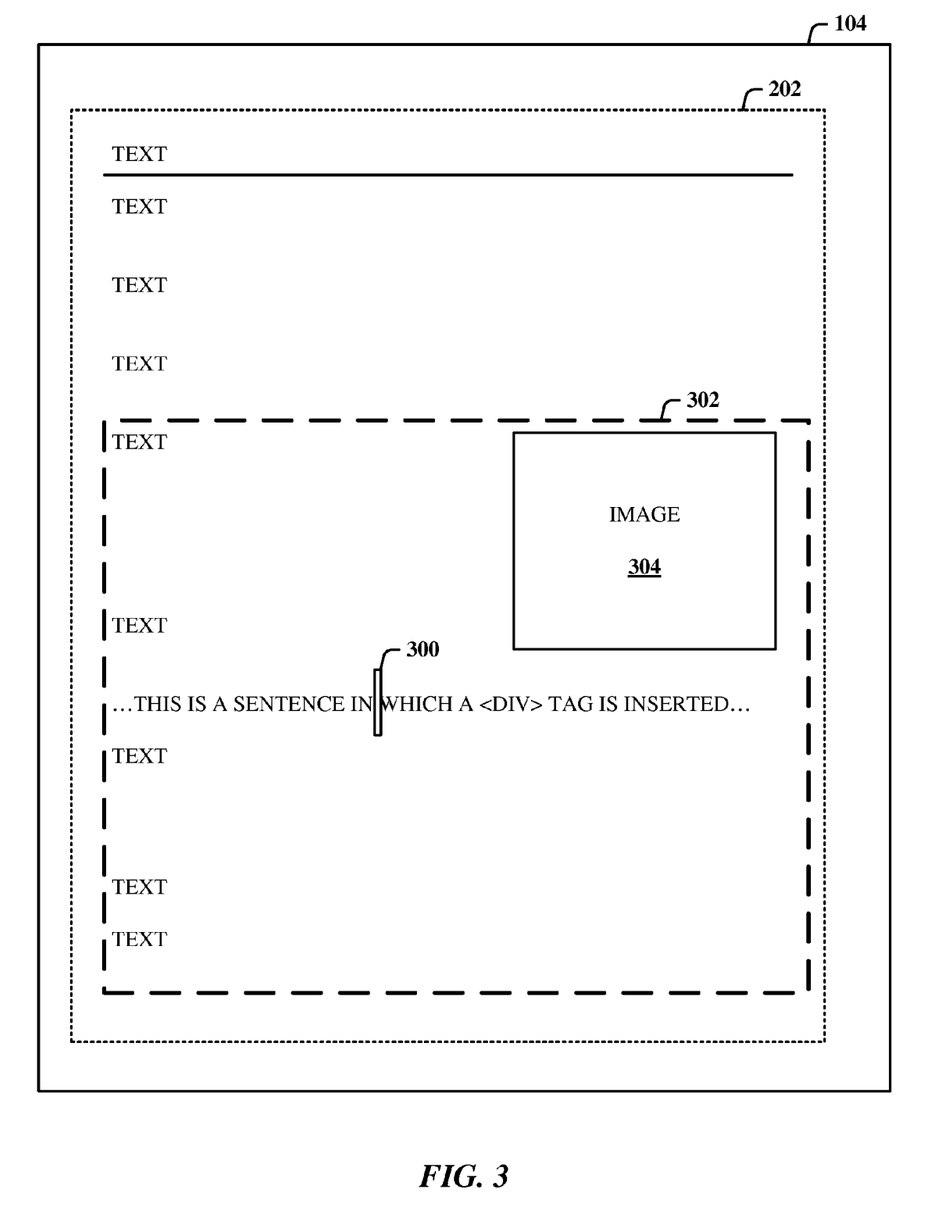
FIG. 3 illustrates a content-editable region for rich text editing of content of the webpage.

FIG. 3 illustrates a content-editable region 300 for rich text editing of content 202 of the webpage 104. The content 202 (bounded by the dotted line box) can be rich text content that includes text and images. A browser editable region 302 (bounded by the dashed line box) can be defined using a CSS (cascading style sheet) class on otherwise typical HTML markup. Accordingly, content 202 that is editable (e.g., text) can be marked with a class name (e.g., ms-rteState-write), and content 202 that is not editable (e.g., image 304) within the editable region 302 is marked with a different class name such as ms-rteState-read (e.g., reusable content).

When a user clicks inside of the editable region 302, the browser content-editable region 300 is dynamically inserted at the location of the user click (e.g. mouse pointer). The browser content-editable region 300 can be presented as cursor block or disc or flashing vertical bar having a height approximating or equivalent to the current line height. (In one conventional browser, an IFrame is positioned where the user clicks, with the whole IFrame document marked as content-editable.) As the user enters (types) characters using an IME (input method editor), or pastes content, the content is moved dynamically from the browser content-editable region 300 to the editable region 302 associated with the rich text editing component. Cursor movements around the editable region 302, as well as changes in selection and operations over the selections, are managed by the functionality of the hybrid rich text editor 206. A browser content editable <div> can be employed as an insertion pointer in the HTML markup.

Since the insertion pointer is within the browser content-editable region 300, the client handles the flashing vertical bar. The browser content-editable region 300 is moved to an HTML DOM (document object model) location from where the browser content-editable region 300 operates. For the browser content-editable region 300 not to disturb the WYSIWYG of the content 202, the browser content-editable region 300 (div insertion pointer) will be placed on screen using absolute positioning. To minimize the amount of complexity with positioning an absolute div at the correct location, the absolute div is placed inside a relative div, which is placed at the insertion pointer location. This allows inheritance of the correct line height and makes the browser content-editable region 300 behave like a familiar flashing insertion pointer offered by traditional browser content-editable functionality.

With respect to up/down cursor movements, one browser implements the up/down movements using a moveToPoint (X,Y) functionality provided by the browser. This function returns a range at the specified X,Y coordinate. Hence, the hybrid rich text editor 206 of FIG. 2 uses the current insertion pointer X,Y position, and then modifies the Y value by increasing/decreasing the Y value until the range returned is higher/lower than the current insertion pointer.

In another browser, the up/down movements are implemented using a pasteHtml(' . . . ') of a range. A range object is moved left/right X number of characters, then using pasteHtml( ), a marker span is inserted at the range location. Using the marker X,Y position on the page the hybrid rich text editor 206 figures out if the process is to be repeated and continues until detection that the marker is above/below the current insertion pointer.

For both browsers, when performing multiple up/down movements, the insertion pointer X position for the first up/down movement is stored and re-used for future up/down of the insertion pointer. The stored X value is cleared when the user presses any key other than Up or Down.

With respect to left/right cursor movements, in the first browser the left/right movements are implemented using a move ("character", unit) functionality provided by the browser. This correctly handles the insertion pointer location.

In the second browser the move function may not exist, and thus, can be implemented using the disclosed logic by walking a DOM tree.

When moving left, a single step is defined as follows. Offset is a problem where HTML includes elements that are not visible in the RTE as text, and therefore, cannot be moved left/right by one DOM element character since not every character is visible text. If the current element is a text node and an offset property>0, then the offset value is decreased by 1. If the current element is a text node and the offset property=0, then the previous element is retrieved. If the previous element (or an element while walking the DOM tree) is a block element, then movement is to the text end of that element; otherwise, process as a text node, but also repeat this process a second time.

(<span>A</span><span>B</span>) (Right of A is the same as Left of B).

(<div>A</div><div>B</div>) (Right of A is different then Left of B).

Updating content in realtime (a "live" preview) can works as follows. When a preview command is executed (e.g., hovering a pointer over a style option), first, a snapshot is taken of the current HTML in the hybrid editor. The actual command is then performed using client-side JavaScript, as if the user were to commit the command. The user then can either revert the command or commit the command. Reverting the command is accomplished either by not selecting the command or by previewing a different command (e.g., a different style option, using the example above). In this case, the snapshot is reverted to. In the case of committing the command, the command that is being previewed is committed.

With respect to realtime processing of content as the content is entered, this can work as follows. As content is typed, the browser puts the content into the content-editable region 300. For the disclosed hybrid rich text editor design, this is effectively the insertion pointer. A browser-specific script transfers this content out using DOM operations, and into the browser DOM. Special cases can be handled as the user types or pastes in the content, to process more than just what was immediately typed. For example, if the user enters (e.g., types) a string that begins with http://, then when entry has completed, a link is created that surrounds the content. This means that some level of look-back or memory for what has been entered is provided. In other words, the rich text editing component includes a look-back memory for storing user input and automatically formatting the stored input when input completion is indicated.

In order to be cross-browser yet share a common set of commands, the hybrid rich text editor uses the common abstraction layer (e.g., implemented using JavaScript). The abstraction layer (e.g., abstraction component 108 of FIG. 1) presents a common set of functions for primitives such as moving the cursor, adding and removing elements and attributes, and so on. The abstraction layer then defines function behaviors based on the current browser, and facilitates browser-specific treatments for these primitives.

One example is a canvas range (CanvasRange) object. The canvas range object represents the selection in the hybrid rich text editor. While this may be common across browsers via the abstraction layer, the canvas range object can be implemented using different JavaScript definitions underneath that are browser-specific.

The hybrid rich text editor is extensible by supporting third-party plug-ins, and adding or overriding commands. This can work as follows. A rich text editor page component loads a chain of JavaScript commands that are registered. The page component then calls into the latest set of commands.

Each command set has the opportunity to either handle a given command that is raised or pass to the next command set.

With this model, a third-party vendor can register a third-party command set, define new or override existing functions, and be assured that third-party functions are called first, before the out-of-box functions.

The hybrid rich text editor can be almost entirely a client-side implementation. Thus, a third-party vendor can do the following to leverage the hybrid editor behaviors: add class=ms-rtestate-write as an attribute on an HTML element (this makes the content editable in the browser), and write a commit model for the content, which means a way to take the HTML within the element that has class=ms-rtestate-write, and storing the HTML somewhere (e.g., when the user clicks "save").

Figure 4:
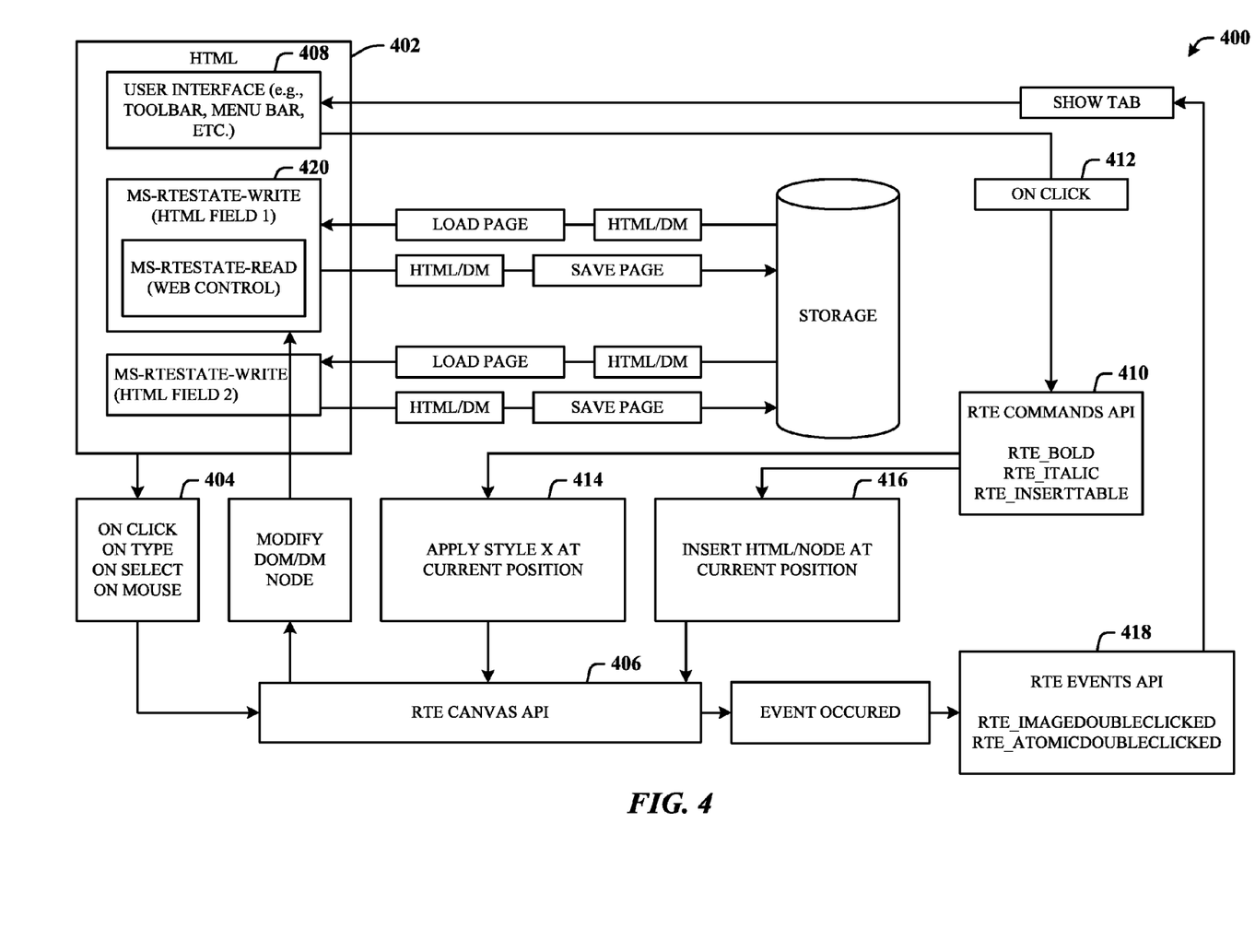
FIG. 4 illustrates an exemplary implementation flow of hybrid rich text editor entities and webpage content.

FIG. 4 illustrates an exemplary implementation flow 400 of hybrid rich text editor entities and webpage content. The webpage includes HTML language 402 that defines textual content and/or image content (rich content). The editable content within the editable region (e.g., HTML field 1 and HTML field 2) is tagged with ms-rtestate-write, and the non-editable content (web control) in the editable region is tagged with ms-rtestate-read. Events 404 occurring in the editable region can include onclick, ontype, onselect, onmouse, etc.

An HRTE (hybrid rich text editor) canvas API 406 registers for the events 404, for example, onclick events (either on the document.body or from an action manager). The canvas API 406 then retrieves the DOM Range of where the click occurred. From this range the RTE canvas API 406 walks the DOM tree until it finds ms-rteState-write (editable Region). If found, the RTE canvas API 406 places the insertion pointer at the event location or selects the complete ms-rteState-read DOM element, if the event location occurs within that region. A class ms-rteState-active is added if the editable region DOM element does not have it, while the prior editable region with ms-rteState-active is removed.

More specifically, when an onclick event occurs, the RTE canvas API 406 detects if a selection occurred. If a selection occurred, then the RTE canvas API 406 compares the event X/Y location to the X/Y of the selection start/end. The closest start/end of the selection is defined as the anchor, and stored. This anchor is used by the RTE canvas API 406 as the starting point when a selection exists and a cursor movement occurs.

Controls for the HRTE can be located on a user interface 408 (toolbar, menu bar, or similar user interface). The controls dispatch events to an action manager. Each of the events represents an RTE command that can be processed by an RTE commands API 410, such as RTE_Bold. Each RTE command interacts with the RTE canvas API 406 to perform the command action. For example, RTE_Bold can call CVS_SelectionApplyStyle("font-weight","bold").

When text formatting is applied, if the selection/insertion point has a surrounding element (div, span), formatting is applied to that element. If the selection/insertion point does not have a surrounding element, a surrounding <span> element is created and then the formatting is applied to that element. If the text formatting is to be a new element, that element is added around the selection/insertion point.

When a single image (non-text content) is selected, the RTE canvas API 406 informs the user interface 408 to show a contextual command UI for the selected image. Then properties (e.g., width, height, horizontal/vertical space) are read from the image and sent to the user interface 408 for display.

As illustrated, an onclick event 412 is picked up at the RTE commands API 410, and processed to apply style X at the current position 414 and/or insert HTML/node at the current position 416. The commands (414 and 416) are executed in the RTE canvas API 406. Events 404 that occur are also passed from the RTE canvas API 406 to the RTE events API 418. Node modification can occur from the RTE canvas API 406 to the editable and/or non-editable content 420.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
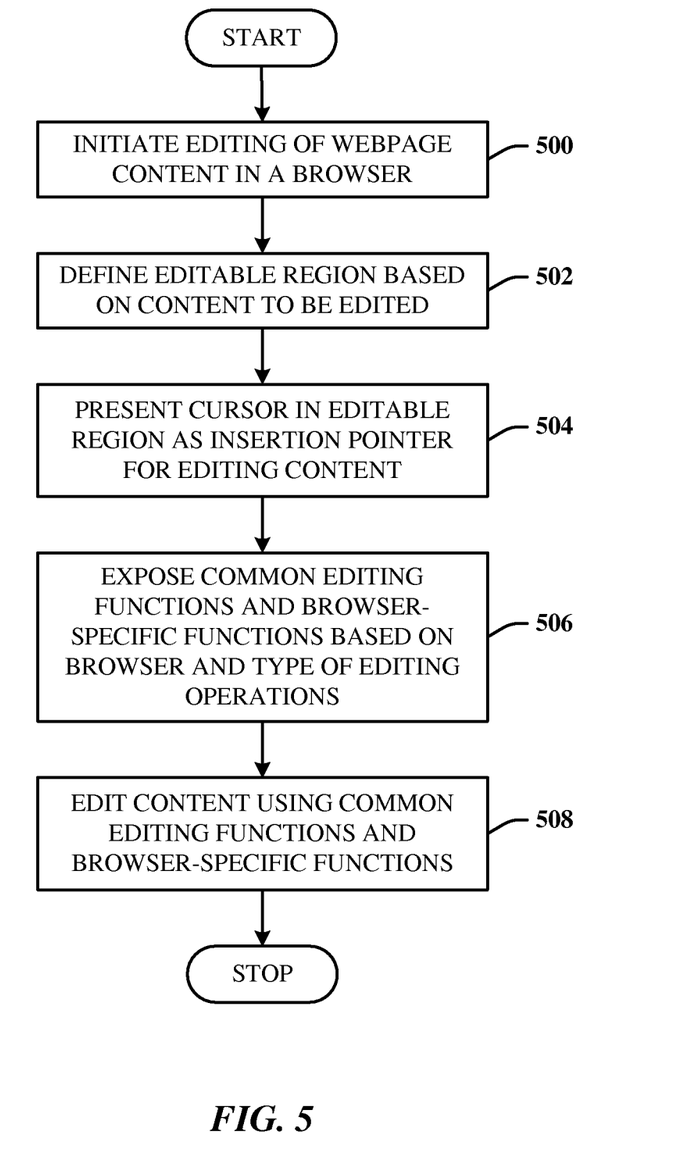
FIG. 5 illustrates a method of editing content.

FIG. 5 illustrates a method of editing content. At 500, editing of webpage content in a browser is initiated. At 502, an editable region is defined based on the content to be edited. At 504, a cursor is presented in the editable region as an insertion pointer for editing the content. This step is optional in that the cursor is made apparent when the user clicks into the editable region. Thus, it is possible to have a page in "edit mode" without the cursor visible until the user clicks into the region. At 506, common editing functions and browser-specific functions based on the browser and type of editing operations are exposed. At 508, the content is edited using the common editing functions and browser-specific functions.

Additional steps described herein can include controlling (managing) where the cursor is placed in the editable region, controlling movement of the cursor in the editable region, and transitioning of the cursor to and from different structures. The keystrokes associated with the editing can be processed using JavaScript browser-specific functions. The editing capability of the browser can be limited to the insertion pointer. The content can be processed as the content is entered to present a live preview of how the edited content will look. As previously described, the content entered at the insertion pointer can be copied from the editable region into HTML code of the webpage.

Figure 6:
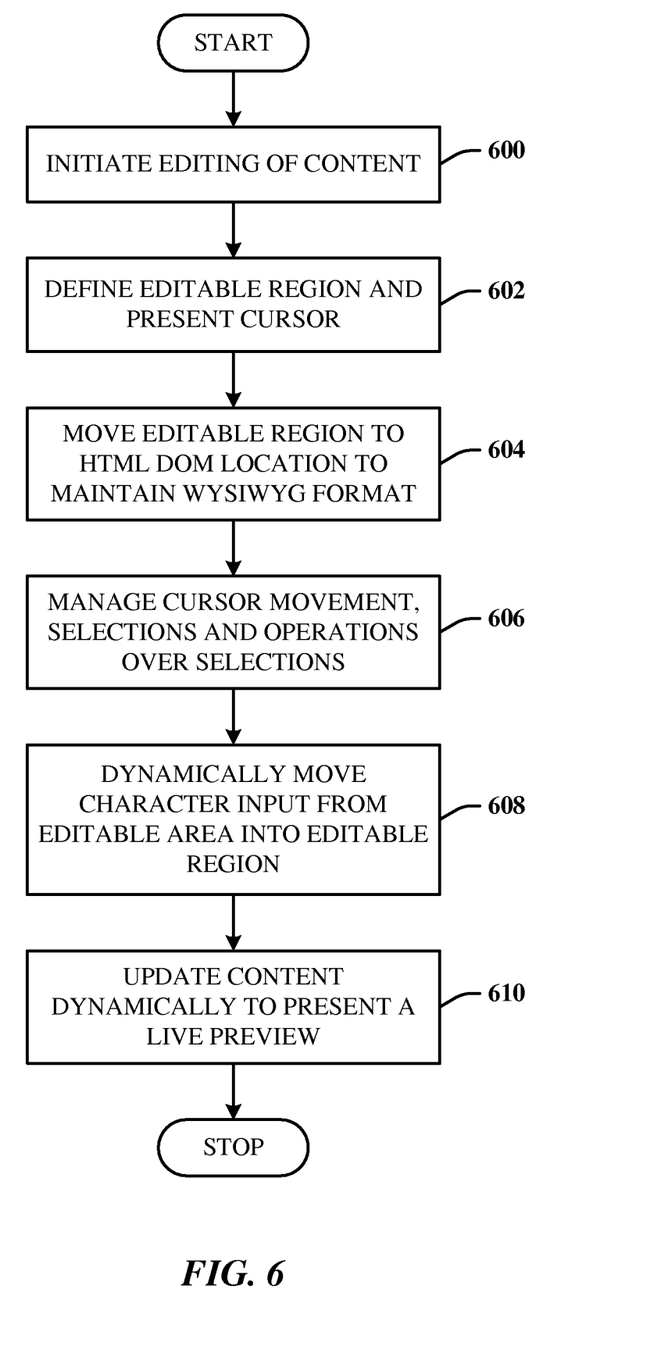
FIG. 6 illustrates a method of managing content during editing.

FIG. 6 illustrates a method of managing content during editing. At 600, editing of webpage content in initiated. At 602, an editable region is defined and a cursor presented in the region. At 604, the editable region is moved to an HTML DOM location to maintain a WYSIWYG format of the content. At 606, cursor movement, selections, and operations over the selection are managed. At 608, character input is dynamically moved from an editable area into the editable region. At 610, the content is updated dynamically to present a live preview.

Figure 7:
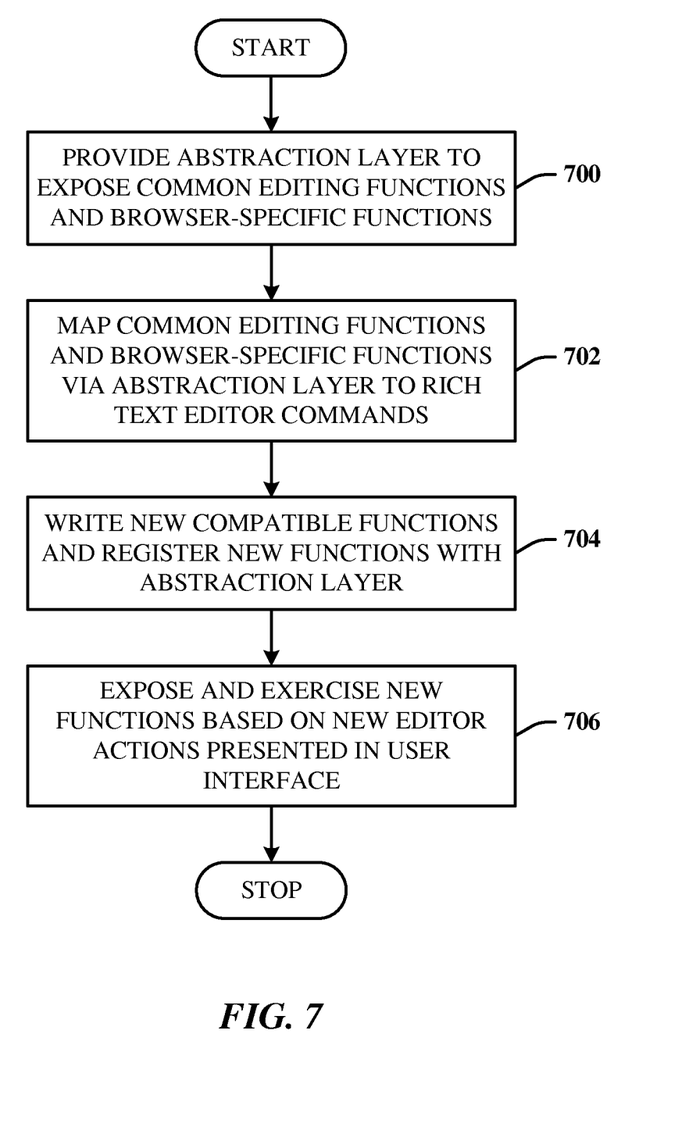
FIG. 7 illustrates a method of providing function extensibility in a rich text editor.

FIG. 7 illustrates a method of providing function extensibility in a rich text editor. At 700, an abstraction layer is provided that exposes common editing functions and browser-specific functions. At 702, the common editing functions and browser-specific functions are mapped to underlying support (commands) of the rich text editor using the abstraction layer. At 704, new compatible functions are written and registered with the abstraction layer. At 706, expose and exercise the new functions based on new editor actions presented in the user interface.

Figure 8:
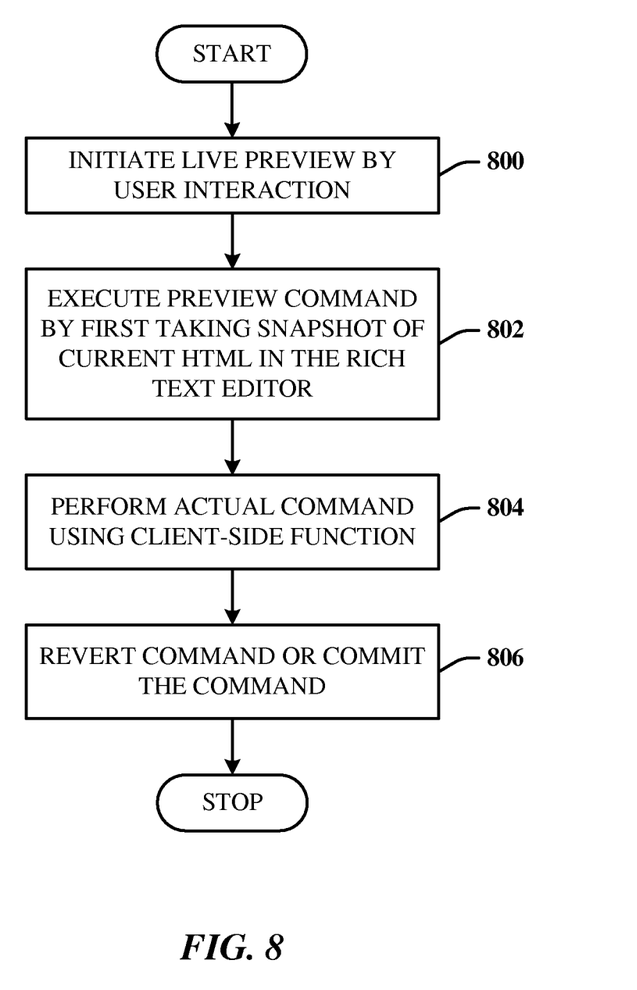
FIG. 8 illustrates a method of presenting live preview of the updated content.

FIG. 8 illustrates a method of presenting live preview of the updated content. At 800, live preview is initiated by user interaction. At 802, a preview command is executed by first taking snapshot of current HTML in the rich text editor. At

804, the actual command is performed using a client-side function (e.g., JavaScript). At 806, the command can be reverted or the user can commit the command.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
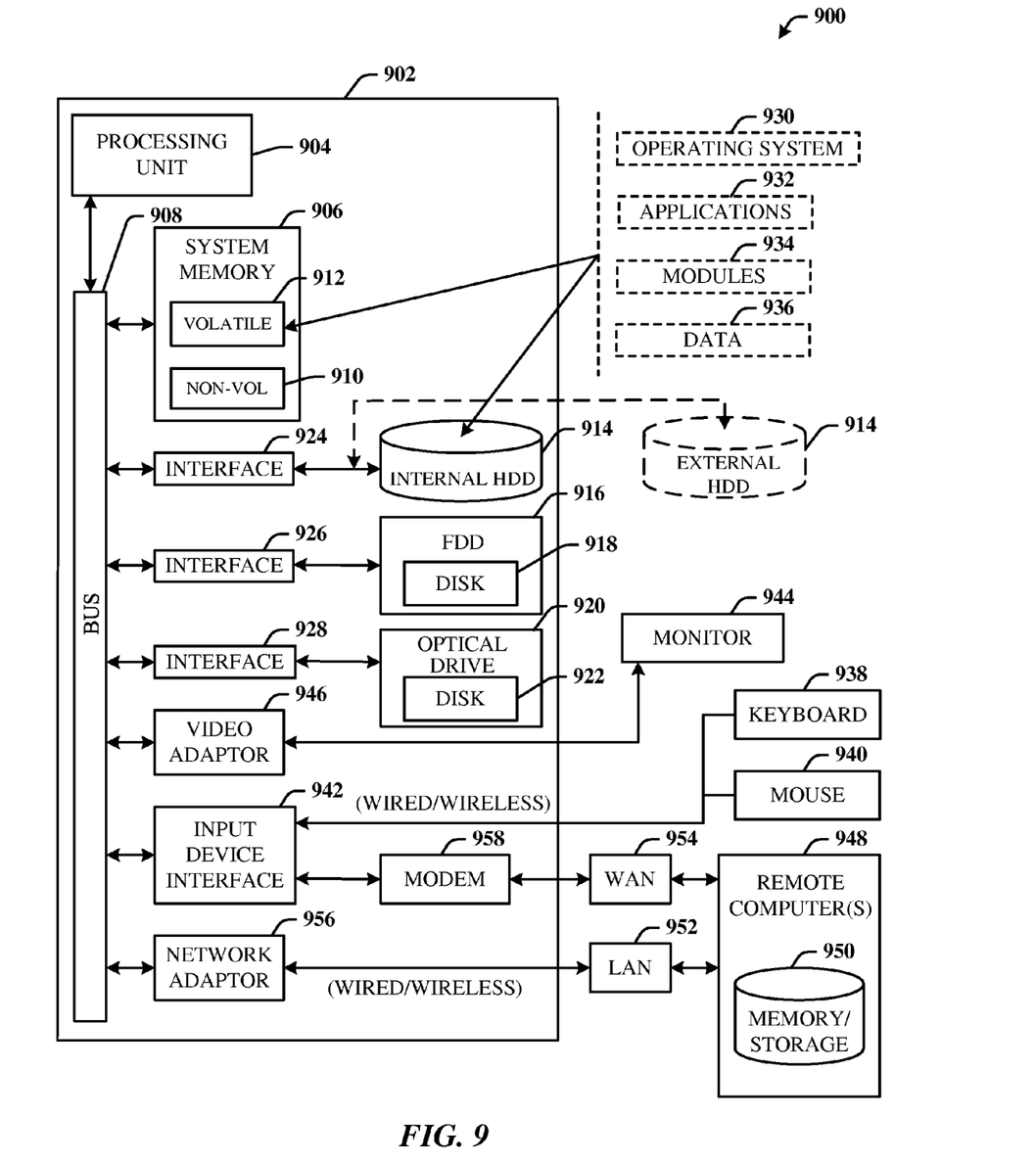
FIG. 9 illustrates a block diagram of a computing system operable to execute hybrid rich text editing in accordance with the disclosed architecture.

Referring now to FIG. 9, there is illustrated a block diagram of a computing system 900 operable to execute hybrid rich text editing in accordance with the disclosed architecture. In order to provide additional context for various aspects thereof, FIG. 9 and the following discussion are intended to provide a brief, general description of a suitable computing system 900 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902 having a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 can include non-volatile memory (NON-VOL) 910 and/or volatile memory 912 (e.g., random access memory (RAM)). A basic input/output system (BIOS) can be stored in the non-volatile memory 910 (e.g., ROM, EPROM, EEPROM, etc.), which BIOS are the basic routines that help to transfer information between elements within the computer 902, such as during start-up. The volatile memory 912 can also include a high-speed RAM such as static RAM for caching data.

The computer 902 further includes an internal hard disk drive (HDD) 914 (e.g., EIDE, SATA), which internal HDD 914 may also be configured for external use in a suitable chassis, a magnetic floppy disk drive (FDD) 916, (e.g., to read from or write to a removable diskette 918) and an optical disk drive 920, (e.g., reading a CD-ROM disk 922 or, to read from or write to other high capacity optical media such as a DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 912, including an operating system 930, one or more application programs 932, other program modules 934, and program data 936. The one or more application programs 932, other program modules 934, and program data 936 can include the rich text editing component 102, the webpage 104, the browser 106, the abstraction component 108, the browser-specific functions 110, different browser types 112 (although unlikely, it may be possible to install multiple browsers on a single computing system), the content 202, the browser editing functions 204, the hybrid rich text editor 206, content-editable region 300, editable region 302, image 304, the entities of the flow 400, and methods described herein, for example.

All or portions of the operating system, applications, modules, and/or data can also be cached in the volatile memory 912. It is to be appreciated that the disclosed architecture can be implemented with various commercially available operating systems or combinations of operating systems.

A user can enter commands and information into the computer 902 through one or more wire/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, etc.

A monitor 944 or other type of display device is also connected to the system bus 908 via an interface, such as a video adaptor 946. In addition to the monitor 944, a computer typically includes other peripheral output devices (not shown), such as speakers, printers, etc.

The computer 902 may operate in a networked environment using logical connections via wire and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, is connected to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 10:
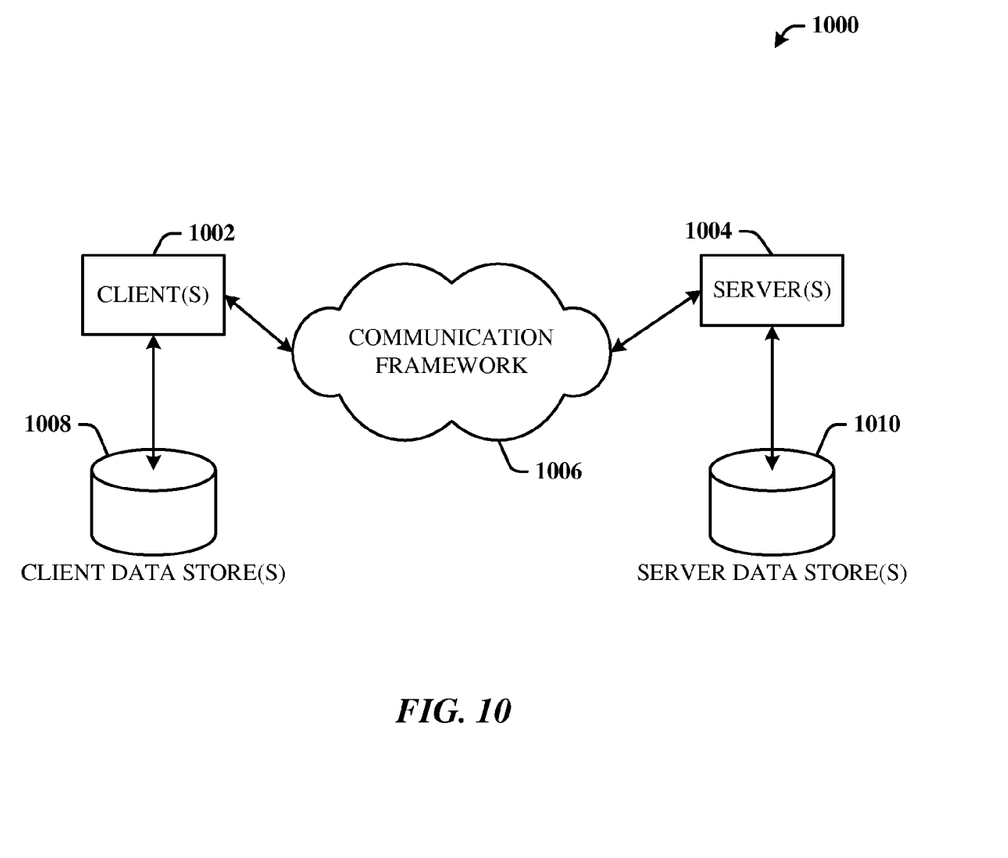
FIG. 10 illustrates a schematic block diagram of an exemplary computing environment for hybrid rich text editing.

Referring now to FIG. 10, there is illustrated a schematic block diagram of an exemplary computing environment 1000 for hybrid rich text editing. The environment 1000 includes one or more client(s) 1002. The client(s) 1002 can be hardware and/or software (e.g., threads, processes, computing devices). The client(s) 1002 can house cookie(s) and/or associated contextual information, for example.

The environment 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communication network such as the Internet) that can be employed to facilitate communications between the client(s) 1002 and the server(s) 1004.

Communications can be facilitated via a wire (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

The client(s) 1002 can include the hybrid rich text editor 206, the browser 106 (or multiple different browsers 112) and the server(s) 1004 can include services for serving up the webpage 104 and content 202 from the server data store(s) 1010, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable storage device having a memory for storing computer-executable components, the memory storing computer-executable components that, when executed by a processor of a computing device, implement a computer-implemented editing system on the computing device, the computer-executable components comprising:

a rich text editor that provides cross-browser rich text editing capability for editing webpage content via different browsers, wherein:

each different browser provides one or more browser functions that are included as part of each different browser and support selecting and editing webpage content within editable areas of webpages, and the rich text editor detects selection by a current browser of webpage content within an editable area of a webpage, determines that the selected webpage content is editable by the rich text editor when the selected webpage content has been tagged by a provider of the webpage content with a class specific to the rich text editor that is used to indicate editable webpage content, dynamically generates an insertion pointer within the editable area of the webpage at a location of the selected webpage content, manages movement of the insertion pointer in response to cursor behavior within the editable area of the webpage, and limits editing functions provided by the current browser to the insertion pointer; and an abstraction layer that exposes a set of browser-specific script functions to be utilized by the rich text editor based on the current browser, wherein:

the browser-specific script functions support a common set of rich text editing commands provided in a user interface that can be presented by each different browser, the browser-specific script functions are utilized by the rich text editor to process inserted content in real-time when entered into the insertion pointer via a typing operation or one or more editing functions included as part of the current browser, and the browser-specific script functions are utilized by the rich text editor to copy the inserted content from the insertion pointer into markup language of the webpage for updating the webpage content.

2. The computer-readable storage device of claim 1, wherein the abstraction layer maps the browser-specific script functions to the rich text editor.

3. The computer-readable storage device of claim 1, wherein the rich text editor processes the inserted content in the insertion pointer to present a preview of how the inserted content will look when formatted.

4. The computer-readable storage device of claim 1, wherein the rich text editor automatically formats typed content entered into the insertion pointer when entry of the typed content is completed.

5. The computer-readable storage device of claim 1, wherein the abstraction layer is extensible for receiving new third-party functions that operate in response to specific events activated in the rich text editor.

6. The computer-readable storage device of claim 5, wherein the text editor receives a new third-party command set that overrides one or more existing rich text editing commands provided by the rich text editor.

7. The computer-readable storage device of claim 1, wherein the rich text editor determines that other selected webpage content is not editable by the rich text editor when the other selected webpage content has been tagged by a provider of the other webpage content with a class specific to the rich text editor that is used to indicate read-only webpage content.

8. A computing system comprising:
a processor for executing computer-executable components; and
memory storing computer-executable components including:

a rich text editor that provides cross-browser rich text editing capability for editing webpage content via different browsers, wherein:

each different browser provides one or more browser functions that are included as part of each different browser and support selecting and editing webpage content within editable areas of webpages, and the rich text editor detects selection by a current browser of webpage content within an editable area of a webpage, determines that the selected webpage content is editable by the rich text editor when the selected webpage content has been tagged by a provider of the webpage content with a class specific to the rich text editor that is used to indicate editable webpage content, dynamically generates an insertion pointer within the editable area of the webpage at a location of the selected webpage content, manages movement of the insertion pointer in response to cursor behavior within the editable area of the webpage, and limits editing functions provided by the current browser to the insertion pointer; and an abstraction layer that exposes a set of browser-specific script functions to be utilized by the rich text editor based on the current browser, wherein:

the browser-specific script functions support a common set of rich text editing commands provided in a user interface that can be presented by each different browser, the browser-specific script functions are utilized by the rich text editor to process inserted content in real-time when entered into the insertion pointer via a typing operation or one or more editing functions included as part of the current browser, and the browser-specific script functions are utilized by the rich text editor to copy the inserted content from the insertion pointer into markup language of the webpage for updating the webpage content.

9. The system of claim 8, wherein the insertion pointer presents the inserted content in a what you see is what you get (WYSIWYG) format for editing.

10. The system of claim 8, wherein the rich text editor processes the inserted content in the insertion pointer to present a preview of how the inserted content will look when formatted.

11. The system of claim 8, wherein the abstraction layer is extensible for receiving new third-party functions that operate in response to specific events activated in the rich text editor.

12. The system of claim 11, wherein the text editor receives a new third-party command set that overrides one or more existing rich text editing commands provided by the rich text editor.

13. The system of claim 8, wherein the rich text editor determines that other selected webpage content is not editable by the rich text editor when the other selected webpage content has been tagged by a provider of the other webpage content with a class specific to the rich text editor that is used to indicate read-only webpage content.

14. A computer-implemented method of editing webpage content, comprising:

initiating, on computing device, a rich text editor that provides cross-browser rich text editing capability for editing webpage content via different browsers, wherein each different browser provides one or more browser functions that are included as part of each different browser and support selecting and editing webpage content within editable areas of webpages;

detecting, by the rich text editor, selection by a current browser of webpage content within an editable area of a webpage;

determining, by the rich text editor, that the selected webpage content is editable by the rich text editor when the selected webpage content has been tagged by a provider of the webpage content with a class specific to the rich text editor that is used to indicate editable webpage content;

dynamically generating, by the rich text editor, an insertion pointer within the editable area of the webpage at a location of the selected webpage content;

managing, by the rich text editor, movement of the insertion pointer in response to cursor behavior within the editable area of the webpage;

limiting, by the rich text editor, editing functions provided by the current browser to the insertion pointer;

providing, by the rich text editor, a common set of rich text editing commands in a user interface that can presented by each different browser, wherein:

the common set of rich text editing commands provided in the user interface is supported by a set of browser-specific script functions that is exposed to the rich text editor based on the current browser, the browser-specific script functions are utilized by the rich text editor to process inserted content in real-time when entered into the insertion pointer via a typing operation or one or more editing functions included as part of the current browser employed by the computing device, and the browser-specific script functions are utilized by the rich text editor to copy the inserted content from the insertion pointer into markup language of the webpage for updating the webpage content; and editing, by the rich text editor, the webpage content using one or more of the browser-specific script functions that support the common set of rich text editing commands.

15. The method of claim 14, further comprising:
processing, by the rich text editor, the inserted content in the insertion pointer to present a preview of how the inserted content will look when formatted.

16. The method of claim 14, wherein the browser-specific script functions are mapped to the common set of rich text editing commands.

17. The method of claim 14, further comprising:
receiving, by the text editor, a new third-party command set that overrides one or more existing rich text editing commands provided by the rich text editor.

18. The method of claim 14, wherein the insertion pointer presents the inserted content in a what you see is what you get (WYSIWYG) format for editing.

19. The method of claim 14, wherein content can be entered into the insertion pointer via an input method editor function or a paste function included as part of the current browser employed by the computing device.

20. The method of claim 14, wherein the rich text editor determines that other selected webpage content is not editable by the rich text editor when the other selected webpage content has been tagged by a provider of the other webpage content with a class specific to the rich text editor that is used to indicate read-only webpage content.

\* \* \* \* \*